US012668253B2

(12) United States Patent
Ogino et al.

(10) Patent No.: US 12,668,253 B2
(45) Date of Patent: Jun. 30, 2026

(54) DRIVER ASSISTANCE APPARATUS FOR VEHICLE

(71) Applicant: SUBARU CORPORATION, Tokyo (JP)

(72) Inventors: Shuu Ogino, Tokyo (JP); Yuya Innami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 50 days.

(21) Appl. No.: 18/904,162

(22) Filed: Oct. 2, 2024

(65) Prior Publication Data

US 2025/0121837 A1 Apr. 17, 2025

(30) Foreign Application Priority Data

Oct. 13, 2023 (JP) ................................. 2023-177698

(51) Int. Cl.
B60W 30/09 (2012.01)
B60W 50/02 (2012.01)

(52) U.S. Cl.
CPC ........ B60W 50/0205 (2013.01); B60W 30/09 (2013.01); *B60W 2050/022* (2013.01)

(58) Field of Classification Search
CPC .............................. B60W 30/09; B60W 50/14
See application file for complete search history.

(56) References Cited

U.S. PATENT DOCUMENTS 10,507,830 B2 * 12/2019 Kelly .................. F16H 61/0403
2014/0095038 A1 * 4/2014 Breu ..................... B60W 10/06
701/67

2015/0035666 A1 * 2/2015 Scofield ............... G08G 1/0112
340/439
2015/0151754 A1 * 6/2015 Han ....................... B60W 10/06
701/96
2015/0167614 A1 * 6/2015 Malone ................. B60W 10/06
701/54
2018/0229727 A1 * 8/2018 Kelly .................. B60W 30/143
2018/0362045 A1 * 12/2018 Zagorski ............... B60W 10/11
2023/0234589 A1 * 7/2023 Kanzaki .............. B60L 15/2081
701/22

FOREIGN PATENT DOCUMENTS

JP 2023-46596 A 4/2023

* cited by examiner

*Primary Examiner* — Long T Tran
(74) *Attorney, Agent, or Firm* — Rimon P.C.

(57) ABSTRACT

A driver assistance apparatus for a vehicle equipped with a manual transmission as a transmission includes a recognizer, a first processor, a first determiner, a second determiner, and a standby unit. The recognizer recognizes information on a traveling environment outside the vehicle. The first processor executes driver assistance control, based on the traveling environment information. The driver assistance control includes contact avoidance control against an obstacle. The first determiner determines whether an engine stall has occurred in an engine of the vehicle. The second determiner makes a request for cancellation of the driver assistance control when the engine stall has occurred. The standby unit temporarily puts, when the engine stall has occurred during the execution of the contact avoidance control, the request for cancellation of the driver assistance control on standby from occurrence of the engine stall until the vehicle stops.

5 Claims, 12 Drawing Sheets

DRIVER ASSISTANCE APPARATUS FOR VEHICLE

CROSS-REFERENCE TO RELATED APPLICATIONS

The present application claims priority from Japanese Patent Application No. 2023-177698 filed on Oct. 13, 2023, the entire contents of which are hereby incorporated by reference.

BACKGROUND

The disclosure relates to a driver assistance apparatus for a vehicle.

In recent years, many vehicles equipped with a driver assistance apparatus have been put to practical use in the field of automobiles and other vehicles. Basically, the driver assistance apparatus achieves driver assistance control by performing, for example, adaptive cruise control (ACC) and active lane keep centering (ALKC).

Furthermore, as part of driver assistance control, the driver assistance apparatus performs contact avoidance control against obstacles such as stopped vehicles and pedestrians as appropriate (see, for example, Japanese Unexamined Patent Application Publication (JP-A) No. 2023-46596). Contact avoidance control includes automatic emergency braking (AEB) control and automatic emergency steering (AES) control.

To accurately achieve such driver assistance control, the driver assistance control is basically canceled when some malfunction occurs in any of various in-vehicle devices. In this case, engine stalls rarely occur during normal traveling in vehicles equipped with transmissions, such as automatic transmissions (hereinafter referred to as "AT vehicles"). For this reason, the driver assistance apparatus generally regards the occurrence of an engine stall as an engine malfunction and cancels the driver assistance control.

SUMMARY

An aspect of the disclosure provides a driver assistance apparatus for a vehicle equipped with a manual transmission as a transmission. The driver assistance apparatus includes a recognizer, a first processor, a first determiner, a second determiner, and a standby unit. The recognizer is configured to recognize information on a traveling environment outside the vehicle. The first processor is configured to execute driver assistance control, based on the information on the traveling environment. The driver assistance control includes contact avoidance control against an obstacle. The first determiner is configured to determine whether an engine stall has occurred in an engine of the vehicle. The second determiner is configured to make a request for cancellation of the driver assistance control when the engine stall has occurred. The standby unit is configured to temporarily put, when the engine stall has occurred during execution of the contact avoidance control, the request for cancellation of the driver assistance control on standby from occurrence of the engine stall until the vehicle stops.

An aspect of the disclosure provides a driver assistance apparatus for a vehicle equipped with a manual transmission as a transmission. The driver assistance apparatus includes a recognizer and circuitry. The recognizer is configured to recognize information on a traveling environment outside the vehicle. The circuitry is configured to execute driver assistance control including contact avoidance control against an obstacle, based on the information on the traveling environment, determine whether an engine stall has occurred in an engine of the vehicle, make a request for cancellation of the driver assistance control when the engine stall has occurred, and temporarily put, when the engine stall has occurred during execution of the contact avoidance control, the request for cancellation of the driver assistance control on standby from occurrence of the engine stall until the vehicle stops.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
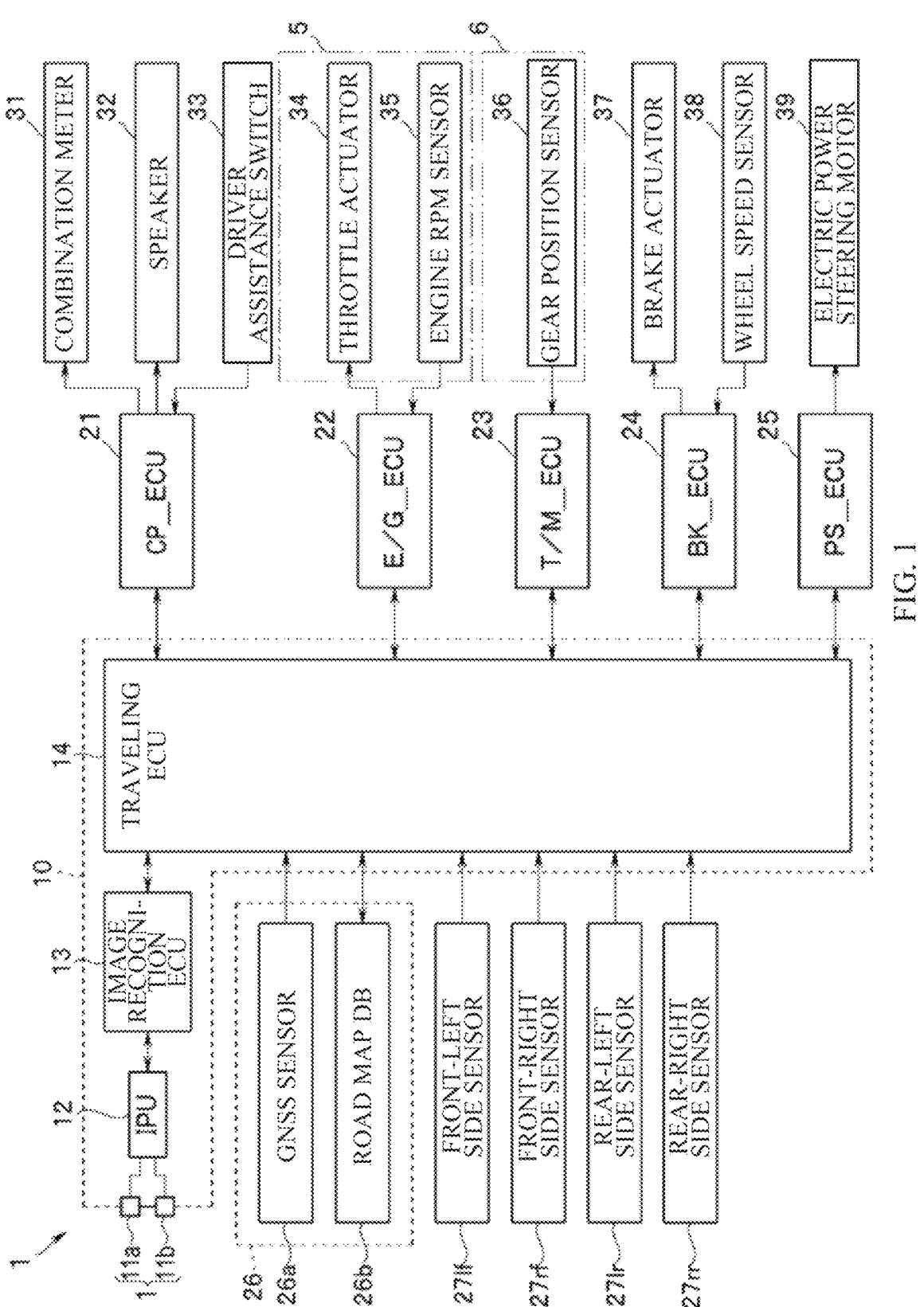
FIG. 1 is a schematic configuration diagram of a driver assistance apparatus according to one example embodiment of the disclosure.

In a vehicle equipped with a manual transmission as a transmission (hereinafter referred to as "MT vehicle"), an engine stall can occur more frequently due to sudden braking during contact avoidance control. Accordingly, if cancellation of driver assistance control is applied to a driver assistance apparatus of the MT vehicle as-is, it can be difficult to achieve appropriate contact avoidance control.

It is desirable to provide a driver assistance apparatus to be applied to a vehicle equipped with a manual transmission as a transmission and making it possible to achieve appropriate contact avoidance control even when an engine stall occurs in the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

A driver assistance apparatus 1 illustrated in FIGS. 1 and 2 may be applied to a vehicle (hereinafter also referred to as an own vehicle O) equipped with a manual transmission as a transmission (a MT vehicle). The driver assistance apparatus 1 may include, for example, a camera unit 10 fixed in the upper front center of the cabin of the own vehicle O.

The camera unit 10 may include a stereo camera 11, an image processing unit (IPU) 12, an image recognition unit (image recognition ECU) 13, and a traveling control unit (traveling ECU) 14.

The stereo camera 11 may include a main camera 11a and a subsidiary camera 11b. The main camera 11a and subsidiary camera 11b may each include a CMOS, for example. The main camera 11a and the subsidiary camera 11b may be disposed symmetrically about the center of the vehicle with respect to a vehicle width direction.

Figure 2:
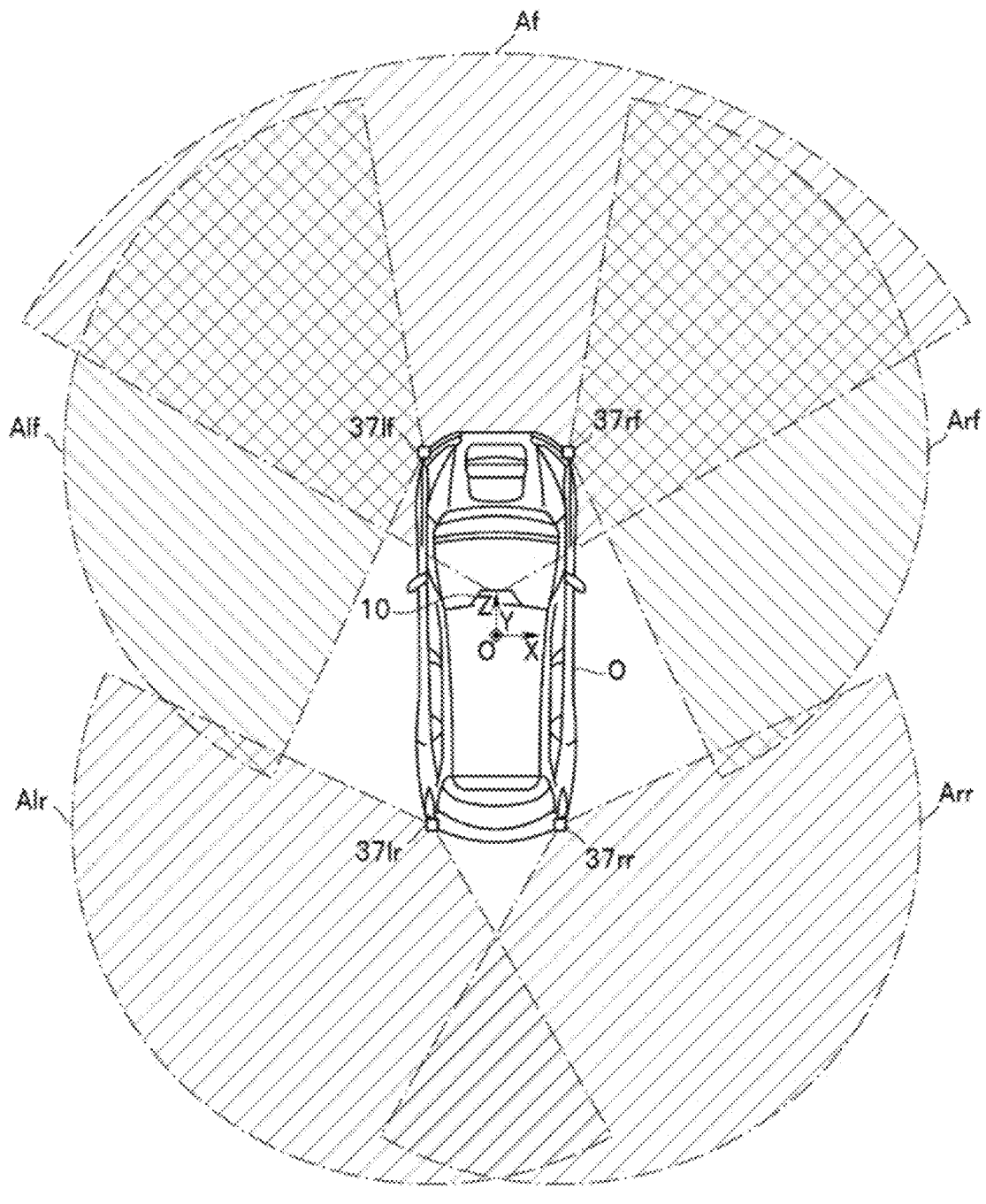
FIG. 2 is a diagram illustrating monitoring areas of a stereo camera and a radar in the driver assistance apparatus illustrated in FIG. 1.

The main camera 11a and the subsidiary camera 11b may capture stereo images of a traveling environment in a region Af located outside and in front of the own vehicle O from different viewpoints, as illustrated in FIG. 2. The main camera 11a and the subsidiary camera 11b may capture images in respective cycles synchronized with each other.

The IPU 12 may process the images of the traveling environment captured by the stereo camera 11 in a predetermined manner. This may allow the IPU 12 to detect edges of various objects, such as three-dimensional objects and marking lines on the road surface, represented on the images. The IPU 12 may then calculate distance information from the amount of misalignment of corresponding edges on the left and right images. This may allow the IPU 12 to generate image information including the distance information (distance image information).

Based on information including the distance image information received from the IPU 12, an image recognition ECU 13 may determine the road curvatures [1/m] of the marking lines defining the left and right edges of the lane (vehicle travel path) in which the own vehicle O is traveling, and the width between the left and right marking lines (lane width). The image recognition ECU 13 may also obtain the road curvatures of the marking lines defining the left and right edges of lanes including an adjacent lane next to the lane in which the own vehicle O is traveling and the width between the left and right marking lines. For these recognitions, the image recognition ECU 13 may perform, for example, a luminance-based binarization process for each pixel of the distance image. This may allow the image recognition ECU 13 to extract candidate points of the marking lines on the road. The image recognition ECU 13 may also perform curve approximation using the least squares method on the point sequence of the extracted candidate points. This may allow the image recognition ECU 13 to obtain the curvatures of the left and right marking lines for each predetermined section. The image recognition ECU 13 may also calculate the lane width from the difference between the curvatures of the left and right marking lines.

Based on the curvatures of the left and right marking lines and the lane width, the image recognition ECU 13 may then calculate factors such as the center of the lane and the deviation of the vehicle's lateral position. Here, the deviation of the vehicle's lateral position may be the distance from the center of the lane to the center of the own vehicle O with respect to the vehicle width direction.

The image recognition ECU 13 may also perform processing such as predetermined pattern matching on the distance image information. This may allow the image recognition ECU 13 to recognize three-dimensional objects such as guardrails extending along the road, curbs, median strip, and surrounding vehicles. The recognition of three-dimensional objects by the image recognition ECU 13 may include, for example, recognition of the types of the three-dimensional objects, the distances to the objects, the speeds of the objects, and the relative velocity between each object and the own vehicle O.

The various types of information recognized by the image recognition ECU 13 may be output to the traveling ECU 14 as information on the traveling environment (hereinafter referred to as traveling environment information).

In one embodiment, the image recognition ECU 13, together with the stereo camera 11 and the IPU 12, may serve as a "recognizer" that recognizes the traveling environment information outside the own vehicle O.

The traveling ECU 14 may be an electronic control unit that controls overall operation of the driver assistance apparatus 1.

This traveling ECU 14 may be coupled to various electronic control units via an in-vehicle communication line such as a controller area network (CAN). Non-limiting examples of the electronic control units may include a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25.

The traveling ECU 14 may be also coupled to a group of various sensors. Non-limiting examples of the sensors may include a locator unit 26, a front-left side sensor 27lf, a front-right side sensor 27rf, a rear-left side sensor 27lr, and a rear-right side sensor 27rr.

The CP_ECU 21 may be coupled to human machine interfaces (HMI) located around the driver's seat, such as a combination meter 31, a speaker 32, and a driver assistance switch 33.

Figure 8:
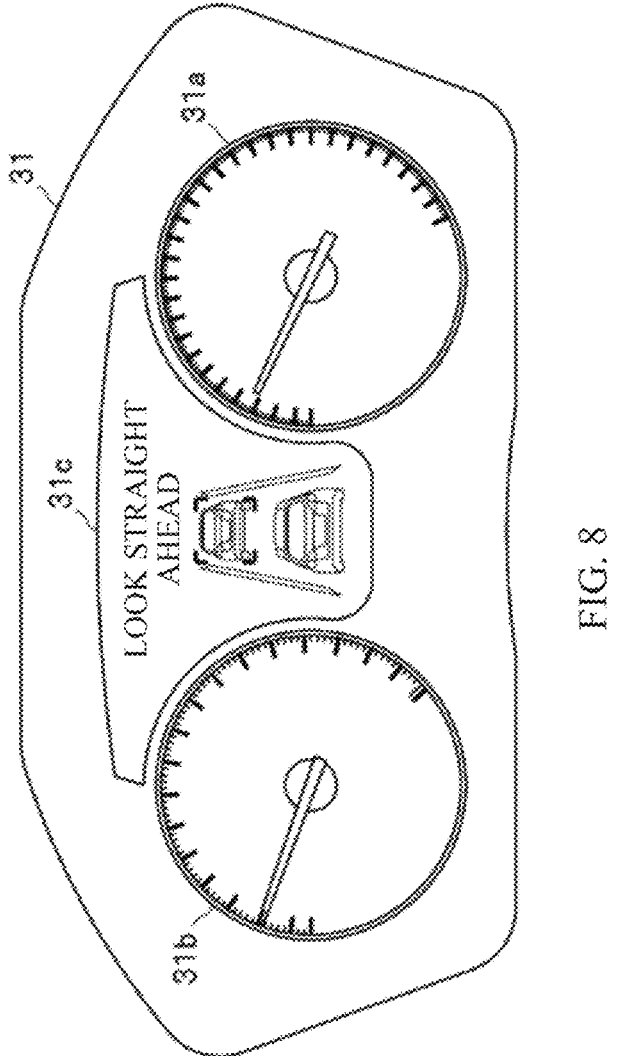
FIG. 8 is a diagram illustrating an example of presentation on a multi-information display of a combination meter in the driver assistance apparatus illustrated in FIG. 1.

As illustrated in FIG. 8, the combination meter 31 may include a speedometer 31a and a tachometer 31b. The speedometer 31a and the tachometer 31b may be arranged side by side on the left and right. The combination meter 31 may further include a multi-information display 31c. The multi-information display 31c may be disposed, for example, between the speedometer 31a and the tachometer 31b.

The driver assistance switch 33 may include, for example, a switch group of operation switches. An operation of turning on or off the driver assistance control or operations of setting various types of driver assistance control may be assigned to each of the operation switches of the driver assistance switch 33.

Upon receiving a control signal from the traveling ECU 14, the CP_ECU 21 may inform as appropriate the driver, who drives the own vehicle O, of various warnings for other objects such as preceding vehicles, the status of execution of driver assistance control, and various types of information on the surroundings, such as the traveling environment, of the own vehicle O, for example, by displaying images on the multi-information display 31*c* and outputting sound from the speaker 32.

The PS_ECU 25 may output various types of information that has been input by the driver's operation through the driver assistance switch 33, to the traveling ECU 14.

A throttle actuator 34 of an electronic control throttle, for example, may be coupled to the output side of the E/G_ECU 22. A group of various sensors, including an engine RPM sensor 35, may be coupled to the input side of the E/G_ECU 22.

The E/G_ECU 22 may control the throttle actuator 34, based on control signals from the traveling ECU 14 or detection signals from the group of various sensors. This may allow the E/G_ECU 22 to adjust the intake air volume of an engine 5 and allow a desired engine output to be generated. The E/G_ECU 22 may also output signals, such as engine RPM detected by the group of various sensors, to the traveling ECU 14.

A group of various sensors, including a gear position sensor 36, may be coupled to the input side of a T/M_ECU 23. The T/M_ECU 23 may calculate, for example, an optimal shift stage of a manual transmission 6, based on, for example, an engine torque signal that has been estimated in the E/G_ECU 22 and detection signals from various sensors. The T/M_ECU 23 may also output a gear position (an actual shift stage) of the manual transmission 6 that has been detected by the gear position sensor 36 and information, such as the optimum shift stage, to the CP_ECU 21. This may cause the CP_ECU 21 to display information, such as the actual shift stage, on the combination meter 31 or other units as appropriate. When the actual shift stage and the optimal shift stage differ from each other, the CP_ECU 21 may send a speed instruction to the driver by displaying an up shift or down shift on the combination meter 31 or other units.

A brake actuator 37 may be coupled to the output side of a BK_ECU 24. The brake actuator 37 may separately adjust the brake fluid pressures output to the brake wheel cylinders on the respective wheels. A group of various sensors, including a wheel speed sensor 38 and a non-illustrated brake pedal sensor, may be coupled to the input side of the BK_ECU 24.

The BK_ECU 24 may control the brake actuator 37, based on a control signal from the traveling ECU 14 or detection signals from the group of various sensors. This may allow the BK_ECU 24 to generate a brake force on each wheel as appropriate to perform forced braking control, yaw-rate control, and other kinds of control on the own vehicle O. The BK_ECU 24 may also output signals indicating wheel speeds, brake operation status, and other information detected by the various sensors to the traveling ECU 14.

An electric power steering motor 39 may be coupled to the output side of a PS_ECU 25. The electric power steering motor 39 may apply the steering torque of the rotational force of the motor to the steering mechanism. A group of various sensors, including a steering torque sensor and a steering angle sensor, may be coupled to the input side of the PS_ECU 25.

The PS_ECU 25 may control the electric power steering motor 39, based on a control signal from the traveling ECU 14 or detection signals from the group of various sensors. This may allow the PS_ECU 25 to generate steering torque for the steering mechanism. The PS_ECU 25 may output signals indicating the steering torque, the steering angle, and other information that have been detected by the various sensors, to the traveling ECU 14.

The locator unit 26 may include a GNSS sensor 26*a* and a high-precision road map database (road map DB) 26*b*.

The GNSS sensor 26*a* may measure the position (e.g., latitude, longitude, and altitude) of the own vehicle O by receiving positioning signals transmitted from positioning satellites.

The road map DB 26*b* may be a large-capacity storage medium such as HDD. High-precision road map information (dynamic map) may be stored in this road map DB 26*b*. The road map information may include, for example, lane data for automatic driving, such as lane width data, lane center position coordinate data, lane travel direction angle data, and speed limit data. Lane data may be stored at intervals of several meters for each lane on the road map. The road map DB 26*b* may output, for example, in response to a request signal from the traveling ECU 14, road map information related to a range set with reference to the position of the vehicle that has been measured by the GNSS sensor 26*a*, as traveling environment information to the traveling ECU 14.

In one embodiment, the road map DB 26*b*, together with the GNSS sensor 26*a*, may serve as the "recognizer" that recognizes the traveling environment information outside the own vehicle O.

The front-left side sensor 27*lf* and front-right side sensor 27*rf* may include millimeter wave radars, for example. The front-left side sensor 27*lf* and front-right side sensor 27*rf* may be located, for example, on the left and right sides of a front bumper of the own vehicle O, respectively. The front-left side sensor 27*lf* and front-right side sensor 27*rf* may detect the traveling environment information on three-dimensional objects in regions Alf and Arf (see FIG. 2) located diagonally to the front-left and front-right and to the sides of the own vehicle O, which are difficult to recognize in the images captured by the stereo camera 11.

The rear-left side sensor 27*lr* and rear-right side sensor 27*rr* may include millimeter wave radars, for example. The rear-left side sensor 27*lr* and rear-right side sensor 27*rr* may be located, for example, on the left and right sides of a rear bumper of the own vehicle O, respectively. The rear-left side sensor 27*lr* and rear-right side sensor 27*rf* may detect the traveling environment information on three-dimensional objects in regions Alr and Arr (see FIG. 2) located diagonally to the rear-left and rear-right and to the sides of the own vehicle O, which are difficult to recognize with the front-left side sensor 27*lf* and front-right side sensor 27*rf*.

When each radar includes a millimeter-wave radar, the millimeter-wave radar may detect mainly three-dimensional objects, such as parallel vehicles and following vehicles, by analyzing the waves reflected from the objects in response to output radio waves. For example, each radar may detect information on a three-dimensional object, such as the width of the object, the position of the representative point of the object (relative position to the own vehicle O), and its speed.

In one embodiment, the front-left side sensor 27*lf*, the front-right side sensor 27*rf*, the rear-left side sensor 27*lr*, and the rear-right side sensor 27*rr* may serve as the "recognizer" that recognizes the traveling environment information outside the own vehicle O.

The coordinates of each object outside the own vehicle O contained in the traveling environment information recognized by the image recognition ECU 13, the locator unit 26, the front-left side sensor 27*lf*, the front-right side sensor 27*rf*, the rear-left side sensor 27*lr*, and the rear-right side sensor 27*rr* may be all converted at the traveling ECU 14 into coordinates that are based on a three-dimensional coordinate system (see FIG. 2) whose origin point is the center of the own vehicle O.

The traveling ECU 14 may perform contact avoidance control, as part of the driver assistance control, against an obstacle Ob, e.g., another vehicle, that is likely to come into contact with the own vehicle O. This contact avoidance control may include, for example, the AEB control and the AES control.

Figure 3:
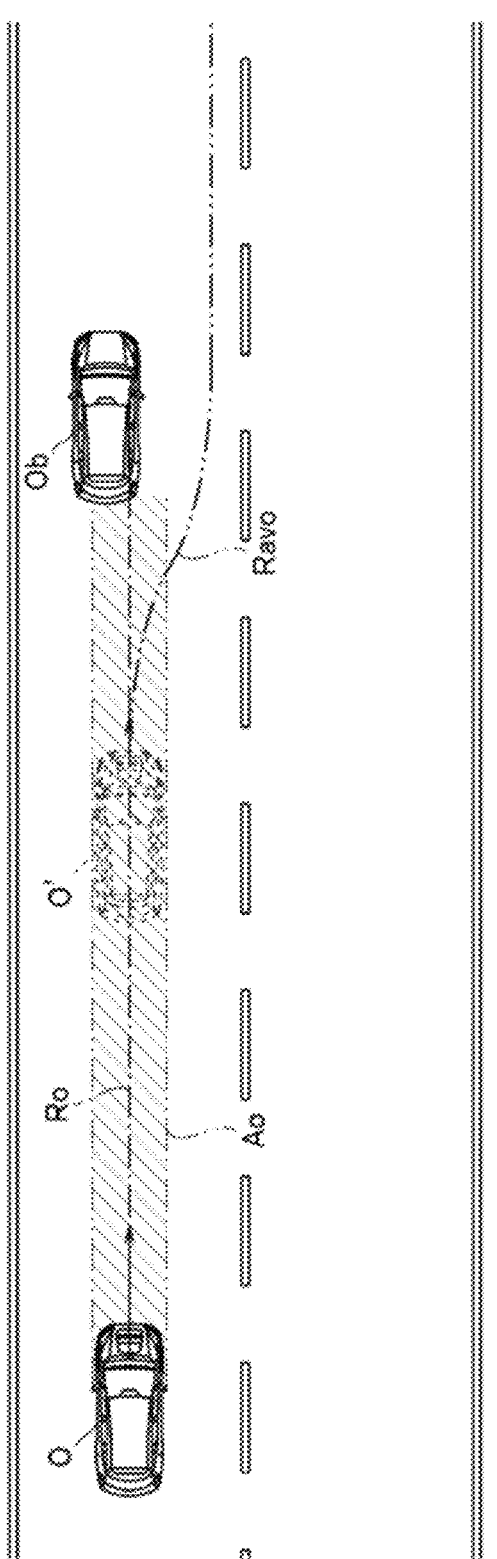
FIG. 3 is a diagram illustrating an obstacle in front of a target path of a vehicle including the driver assistance apparatus illustrated in FIG. 1.

The AEB control may be used to avoid, by braking, contact with the obstacle Ob that exists in front of the own vehicle O on a target travel path Ro. As illustrated in FIG. 3, for example, when the AEB control is performed, the traveling ECU 14 may set a target travel region Ao in front of the own vehicle O. This target travel region Ao may have a predetermined width (e.g., larger than the width of the own vehicle O) centered on the target travel path Ro. Moreover, the traveling ECU 14 may detect, as obstacles Ob, preceding vehicles, parked vehicles, and other vehicles existing in the target travel region Ao, based on the traveling environment information. The traveling ECU 14 may also calculate the time to contact TTC with each obstacle Ob. This time to contact TTC may be calculated, for example, by dividing the relative distance between the own vehicle O and the obstacle Ob by the relative velocity between the own vehicle O and the obstacle Ob.

The traveling ECU 14 may execute primary brake control when the time to contact TTC becomes smaller than a predetermined first threshold Tth1. When the primary brake control is started, the traveling ECU 14 may decelerate the own vehicle O, using a predetermined first target deceleration speed a1 (e.g., 0.4 G).

The traveling ECU 14 may execute secondary brake control when the time to contact TTC becomes smaller than a predetermined second threshold Tth2 (Tth2<Tth1). When the secondary brake control is started, the traveling ECU 14 may decelerate the own vehicle O until the relative velocity to the obstacle Ob becomes "0", using a predetermined second target deceleration speed a2 (e.g., 1 G).

The AES control may be used to avoid, by steering, contact with the obstacle Ob that exists in front of the own vehicle O on the target travel path. For example, when it is determined that the contact with the obstacle Ob is difficult to be avoided by the secondary brake control, the traveling ECU 14 may execute the AES control in combination with the AEB control.

For example, the traveling ECU 14 may execute the AES control when the time to contact TTC becomes smaller than a predetermined third threshold Tth3 (Tth3<Tth2) (see, for example, an own vehicle O' in FIG. 3).

For this AES control, the traveling ECU 14 may set a target lateral position on the side of the obstacle. The traveling ECU 14 may also set a new target travel path Ravo leading the own vehicle O to the target lateral position. In some embodiments, this new target travel path Ravo may have the following split sections: an excess-steering section where the own vehicle O is made go around (to the side of) the obstacle; and a back-steering section where the posture of the own vehicle O is returned toward a direction along the travel path of the vehicle. The traveling ECU 14 may then execute steering control that enables steering along the new target travel path Ravo.

Although its detailed description will be omitted, the traveling ECU 14 may be configured to perform other driver assistance controls such as adaptive cruise control (ACC), active lane keep centering (ALKC), emergency lane keep assist (ELKA), and auto lane changing (ALC).

Here, for example, when an in-vehicle device that helps the driver assistance control malfunctions during the execution of the driver assistance control, the traveling ECU 14 may cancel the driver assistance control. Basically, each control unit may perform malfunction determination for in-vehicle devices.

In this case, the traveling ECU 14 may also cancel the driver assistance control when an engine stall occurs in the engine 5, assuming that the engine 5 (in-vehicle device) has malfunctioned. In other words, when an engine stall occurs during the execution of the driver assistance control, the traveling ECU 14 may request for cancellation (cancellation request) of the driver assistance control. The occurrence of this engine stall may be determined based on the engine RPM and other factors. In some embodiments, the E/G_ECU 22 may determine that an engine stall has occurred when the engine RPM remains below a set RPM (e.g., 300 [rpm]) for a set length of time (e.g., 0.5 [sec]) or longer.

However, when it is determined that an engine stall has occurred while the contact avoidance control is being executed, the traveling ECU 14 may temporarily put the request for cancellation of the driver assistance control on standby from the occurrence of the engine stall until the own vehicle O stops.

In some embodiments, when a set length of time has elapsed since the vehicle speed became "0", the traveling ECU 14 may determine that the own vehicle O has stopped. In such a case, the traveling ECU 14 may maintain the braking force, which is brought by the AEB control, from the time when the vehicle speed becomes "0" until the lapse of the set length of time. Hence, even when the own vehicle O is brought to an emergency stop on a slope, for example, the own vehicle O may be accurately maintained in a stopped state.

When the cancellation determination has been made due to an engine stall, the traveling ECU 14 may cancel the cancellation request on the condition that the engine 5 has restarted.

In one embodiment, the traveling ECU 14 may serve as a "first processor", a "second determiner", a "standby unit", and a "second processor". In one embodiment, the E/G_ECU 22 may serve as a "first determiner".

The determination as to whether to execute the driver assistance control will now be described with reference to the flowchart of a routine of determining whether to execute the driver assistance control illustrated in FIG. 4. This routine may be repeatedly executed in the traveling ECU 14 at set time intervals.

When the routine starts, in Step S101, the traveling ECU 14 may check whether the driver assistance control has been turned on by operation of the driver assistance switch 33 by the driver.

When it is determined in Step S101 that the driver assistance control has been turned off (Step S101: NO), the traveling ECU 14 may cause the procedure to directly exit the routine.

In contrast, when it is determined in Step S101 that the driver assistance control has been turned on (Step S101: YES), the traveling ECU 14 may cause the procedure to proceed to Step S102.

Figure 5:
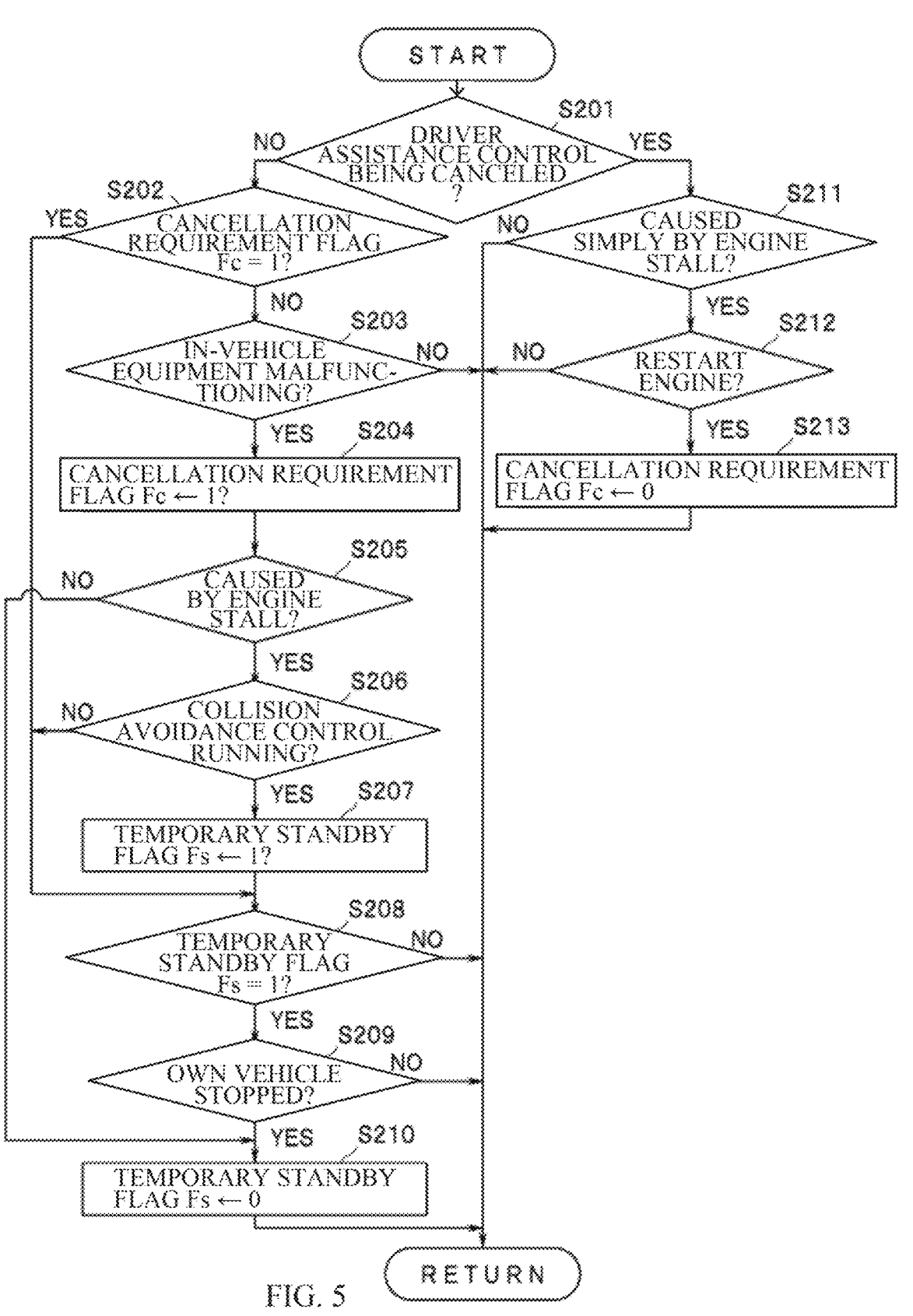
FIG. 5 is a flowchart of an exemplary subroutine of cancellation determination in the driver assistance control illustrated in FIG. 4.

In Step S102, the traveling ECU 14 may determine whether to cancel the driver assistance control (cancellation determination). This cancellation determination may be performed, for example, according to the flowchart of a subroutine of the cancellation determination illustrated in FIG. 5.

When the subroutine starts, in Step S201, the traveling ECU 14 may check whether the driver assistance control is being canceled. In other words, the traveling ECU 14 may check whether a request for cancellation of the driver assistance control is being made.

When it is determined in Step S201 that the driver assistance control is being canceled (Step S201: YES), the traveling ECU 14 may cause the procedure to proceed to Step S211.

In contrast, when it is determined in Step S201 that the driver assistance control is not being canceled (Step S201: NO), the traveling ECU 14 may cause the procedure to proceed to Step S202.

In Step S202, the traveling ECU 14 may check whether the cancellation request flag Fc has been set to "1". Here, the cancellation request flag Fc may be set to "1" when a malfunction (including an engine stall) occurs in the in-vehicle device that helps driver assistance control.

When it is determined in Step S202 that the cancellation request flag Fc has been set to "1" (Step S202: YES), the traveling ECU 14 may cause the procedure to proceed to Step S208.

In contrast, when it is determined in Step S202 that the cancellation request flag Fc has been cleared to "0" (Step S202: NO), the traveling ECU 14 may cause the procedure to proceed to Step S203.

In Step S203, the traveling ECU 14 may check whether a malfunction (including an engine stall) has occurred in the in-vehicle device that helps driver assistance control.

When it is determined in Step S203 that no malfunction has occurred in the in-vehicle device (Step S203: NO), the traveling ECU 14 may directly exit the subroutine.

In contrast, when it is determined in Step S203 that a malfunction has occurred in the in-vehicle device (Step S203: YES), the traveling ECU 14 may proceed to Step S204.

In Step S204, the traveling ECU 14 may set the cancellation request flag Fc to "1" and then cause the procedure to proceed to Step S205.

In Step S205, the traveling ECU 14 may check whether the cancellation request flag Fc has been set to "1" because of an engine stall.

When it is determined in Step S205 that the cancellation request flag Fc has been set to "1" not because of an engine stall (Step S205: NO), the traveling ECU 14 may cause the procedure to proceed to Step S210.

In contrast, when it is determined in Step S205 that the cancellation request flag Fc has been set to "1" because of an engine stall (Step S205: YES), the traveling ECU 14 may cause the procedure to proceed to Step S206.

In Step S206, the traveling ECU 14 may check whether the contact avoidance control in the driver assistance control is currently being executed. In other words, through the determinations made in Steps S205 and S206, the traveling ECU 14 may check whether an engine stall has occurred during the execution of the contact avoidance control.

When it is determined in Step S206 that the contact avoidance control is not being executed (Step S206: NO), the traveling ECU 14 may cause the procedure to proceed to Step S208.

In contrast, when it is determined in Step S206 that the contact avoidance control is being executed (Step S206: YES), the traveling ECU 14 may cause the procedure to proceed to Step S207.

In Step S207, the traveling ECU 14 may set a temporary standby flag Fs to "1" to temporarily put the request for cancellation of the driver assistance control on standby, and then cause the procedure to proceed to Step S208.

When the procedure has proceeded from Step S202, S206, or S207 to Step S208, the traveling ECU 14 may check whether the temporary standby flag Fs has been set to "1".

When it is determined in Step S208 that the temporary standby flag Fs has been cleared to "0" (Step S208: NO), the traveling ECU 14 may cause the procedure to directly exit the subroutine.

In contrast, when it is determined in Step S208 that the temporary standby flag Fs has been set to "1" (Step S208: YES), the traveling ECU 14 may cause the procedure to proceed to Step S209.

In Step S209, the traveling ECU 14 may check whether the own vehicle O is stopping. In other words, the traveling ECU 14 may check, for example, whether the set length of time has elapsed since the vehicle speed of the own vehicle O became "0".

When it is determined in Step S209 that the own vehicle O is not stopping (Step S209: NO), the traveling ECU 14 may cause the procedure to directly exit the subroutine.

In contrast, when it is determined in Step S209 that the own vehicle O is stopping (Step S209: YES), the traveling ECU 14 may cause the procedure to proceed to Step S210.

In Step S210, the traveling ECU 14 may clear the temporary standby flag Fs to "0" and then cause the procedure to exit the subroutine.

When the procedure has proceeded from Step S201 to Step S211, the traveling ECU 14 may check whether the cancellation request flag Fc has been set to "1" simply because of the engine stall.

When it is determined in Step S212 that the cancellation request flag Fc has been set to "1" not simply because of an engine stall (Step S211: NO), the traveling ECU 14 may cause the procedure to directly exit the subroutine.

In contrast, when it is determined in Step S211 that the cancellation request flag Fc has been set to "1" simply because of an engine stall (Step S211: YES), the traveling ECU 14 may cause the procedure to proceed to Step S212.

In Step S212, the traveling ECU 14 may check whether the engine 5 that had stalled has been restarted by the driver who drives the own vehicle O.

When it is determined in Step S212 that the engine 5 has not been restarted (Step S212: NO), the traveling ECU 14 may cause the procedure to directly exit the subroutine.

In contrast, when it is determined in Step S212 that the engine 5 has been restarted (Step S212: YES), the traveling ECU 14 may cause the procedure to proceed to Step S213.

In Step S213, the traveling ECU 14 may clear the cancellation request flag Fc to "0" and then cause the procedure to exit the subroutine.

Figure 4:
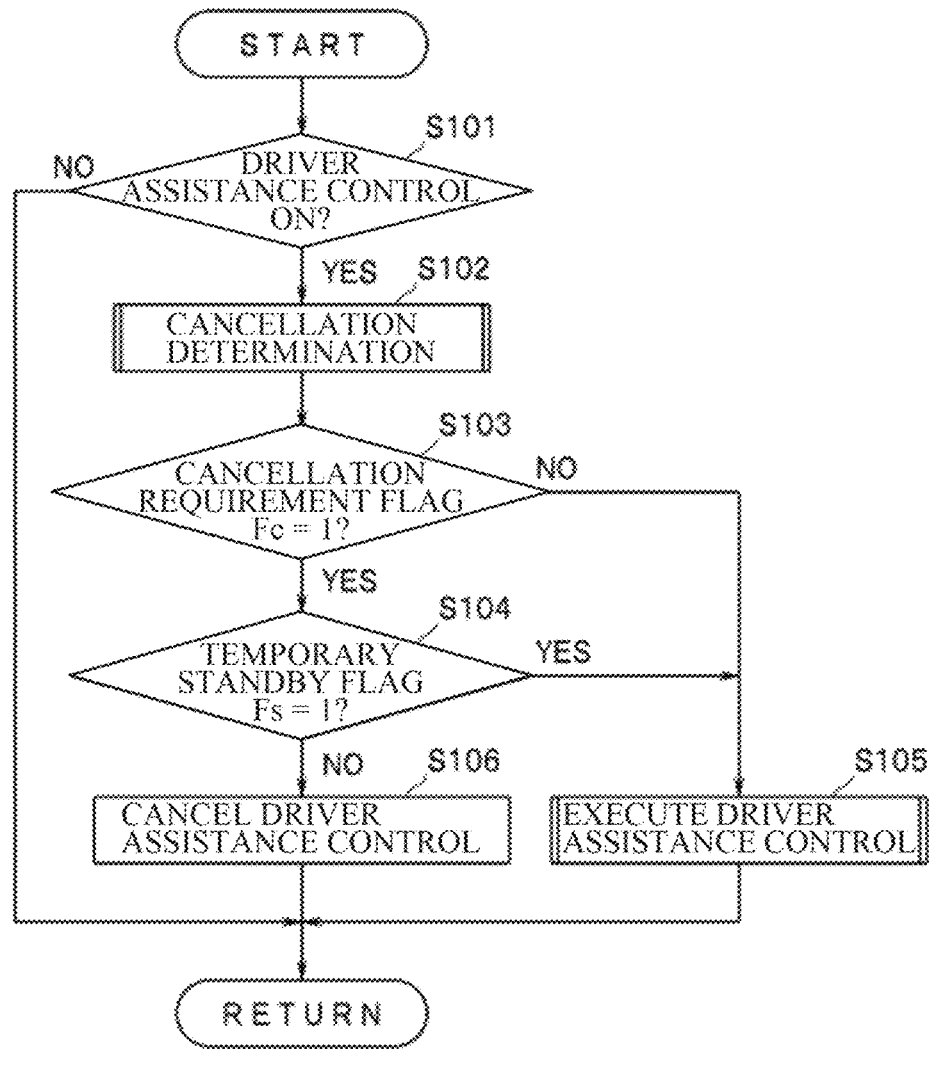
FIG. 4 is a flowchart of a routine of determining whether to execute driver assistance control according to one example embodiment of the disclosure.

When the procedure has proceeded from Step S102 to Step S103 in the main routine illustrated in FIG. 4, the traveling ECU 14 may check whether the cancellation request flag Fc has been set to "1".

When it is determined in Step S103 that the cancellation request flag Fc has been cleared to "0" (Step S103: NO), the traveling ECU 14 may cause the procedure to proceed to Step S105.

When the procedure has proceeded from Step S103 to Step S105, the traveling ECU 14 may execute the driver assistance control and then cause the procedure to exit the routine.

In contrast, when it is determined in Step S103 that the cancellation request flag Fc has been set to "1" (Step S103: YES), the traveling ECU 14 may cause the procedure to proceed to Step S104.

In Step S104, the traveling ECU 14 may check whether the temporary standby flag Fs has been set to "1".

When it is determined in Step S104 that the temporary standby flag Fs has been cleared to "0" (Step S104: NO), the traveling ECU 14 may cause the procedure to proceed to Step S106.

When the procedure has proceeded from Step S104 to Step S106, the traveling ECU 14 may cancel the execution of the driver assistance control and then cause the procedure to exit the routine.

In contrast, when it is determined in Step S104 that the temporary standby flag Fs has been set to "1" (Step S104: YES), the traveling ECU 14 may cause the procedure to proceed to Step S105.

In Step S105, the traveling ECU 14 may execute the driver assistance control and then cause the procedure to exit the routine. In other words, even when the cancellation request flag Fc has been set to "1", if the temporary standby flag Fs has been set to "1", the traveling ECU 14 may put the request for cancellation of the driver assistance control on standby. This allows the driver assistance control to continue to be executed.

Figure 6:
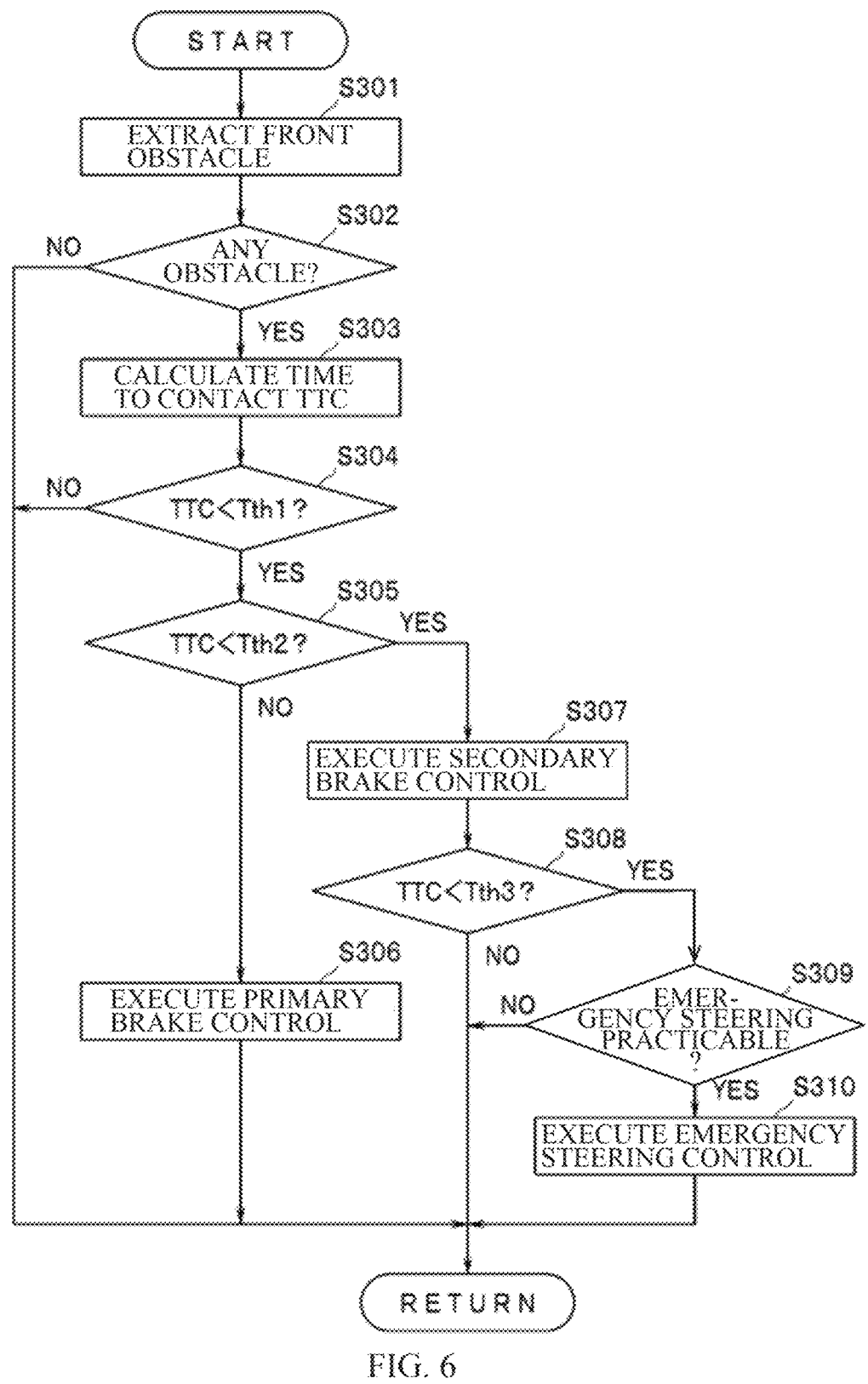
FIG. 6 is a flowchart of an exemplary routine of contact avoidance control in the driver assistance control illustrated in FIG. 4.

Here, the contact avoidance control performed in the driver assistance control in Step S105 described above may be executed according to a flowchart of an exemplary routine of the contact avoidance control illustrated in FIG. 6, for example. This routine may be repeatedly executed in the traveling ECU 14 at set time intervals.

When the routine starts, in Step S301, the traveling ECU 14 may execute a process of extracting the obstacle Ob in front of the own vehicle O from the traveling environment information.

In the subsequent Step S302, the traveling ECU 14 may check whether the obstacle Ob in front of the own vehicle O has been extracted.

When it is determined in Step S302 that no obstacle Ob has been extracted (Step S302: NO), the traveling ECU 14 may cause the procedure to directly exit the routine.

In contrast, when it is determined in Step S302 that obstacle Ob has been extracted (Step S302: YES), the traveling ECU 14 may cause the procedure to proceed to Step S303.

In Step S303, the traveling ECU 14 may calculate the time to contact TTC with respect to the obstacle Ob. In other words, the traveling ECU 14 may calculate the time to contact TTC by dividing the relative distance between the own vehicle O and the obstacle Ob by the relative velocity between the own vehicle O and the obstacle Ob.

In the subsequent Step S304, the traveling ECU 14 may check whether the time to contact TTC is less than the predetermined first threshold Tth1.

When it is determined in Step S304 that the time to contact TTC is greater than or equal to the first threshold Tth (Step S304: NO), the traveling ECU 14 may cause the procedure to directly exit the routine.

In contrast, when it is determined in Step S304 that the time to contact TTC is less than the first threshold (Step S304: YES), the traveling ECU 14 may cause the procedure to proceed to Step S305.

In Step S305, the traveling ECU 14 may check whether the time to contact TTC is less than the predetermined second threshold Tth2 (Tth2<Tth1).

When it is determined in Step S305 that the time to contact TTC is greater than or equal to the second threshold Tth2 (Step S305: NO), the traveling ECU 14 may cause the procedure to proceed to Step S306.

In Step S306, the traveling ECU 14 may decelerate the own vehicle O, using the predetermined first target deceleration speed a1 (e.g., 0.4 G). In other words, the traveling ECU 14 may perform the primary brake control on the obstacle Ob.

In contrast, when it is determined in Step S305 that the time to contact TTC is less than the second threshold Tth2 (Step S305: YES), the traveling ECU 14 may cause the procedure to proceed to Step S307.

In Step S307, the traveling ECU 14 may decelerate the own vehicle O, using the predetermined second target deceleration speed a2 (e.g., 1 G). In other words, the traveling ECU 14 may perform the secondary brake control on the obstacle Ob, using a deceleration speed greater than that in the primary brake control.

In the subsequent Step S308, the traveling ECU 14 may check whether the time to contact TTC is less than the predetermined third threshold Tth3 (Tth3<Tth2).

When it is determined in Step S308 that the time to contact TTC is greater than or equal to the third threshold Tth3 (Step S308: NO), the traveling ECU 14 may cause the procedure to directly exit the subroutine.

In contrast, when it is determined in Step S308 that the time to contact TTC is less than the third threshold Tth3 (Step S308: YES), the traveling ECU 14 may cause the procedure to proceed to Step S309.

In Step S309, the traveling ECU 14 may check whether it is possible to make the own vehicle O steer around the obstacle Ob. In other words, the traveling ECU 14 may check whether an avoidance space for the own vehicle O exists on the side of the obstacle Ob, and whether there are no following vehicles, oncoming vehicles, and other vehicles traveling toward the avoidance space.

When it is determined in Step S309 that it is difficult to make the own vehicle O steer around the obstacle Ob (Step S309: NO), the traveling ECU 14 may cause the procedure to directly exit the routine.

In contrast, when it is determined in Step S309 that it is possible to make the own vehicle O steer around the obstacle Ob (Step S309: YES), the traveling ECU 14 may cause the procedure to proceed to Step S310.

When the procedure has proceeded from Step S309 to Step S310, the traveling ECU 14 may execute the emergency steering control against the obstacle Ob and then cause the procedure to exit the routine.

Figure 7:
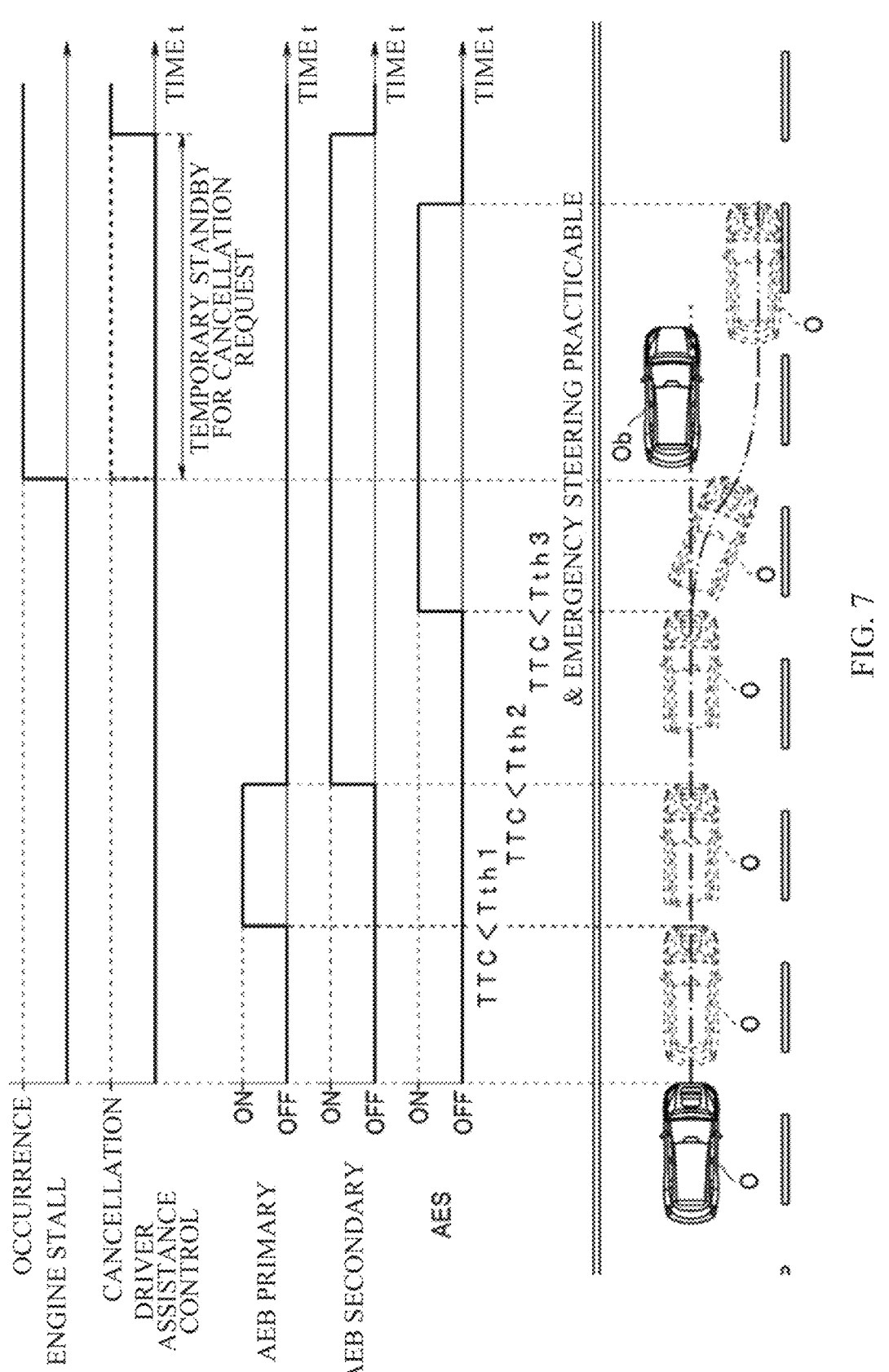
FIG. 7 is a time chart illustrating the status of execution of each control in the contact avoidance control illustrated in FIG. 6.

With such control, as illustrated in FIG. 7, for example, during the AEB control in the contact avoidance control, the primary brake control and the secondary brake control may be performed sequentially in stages according to the time to contact TTC. Furthermore, during contact avoidance control, the emergency steering control dependent on the time to contact TTC may be executed in parallel with the secondary brake control.

When such contact avoidance control is started, as illustrated in FIG. 8, for example, the multi-information display 31c may display a message to alert the driver to the obstacle Ob such as a preceding vehicle.

Figure 9:
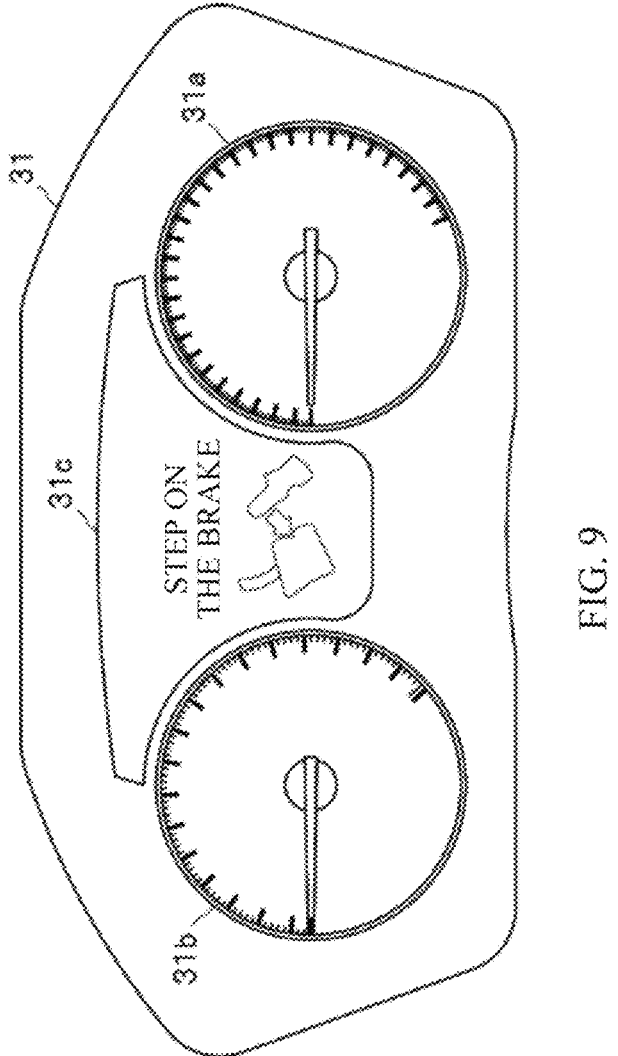
FIG. 9 is a diagram illustrating an example of presentation on the multi-information display of the combination meter in the driver assistance apparatus illustrated in FIG. 1.

When the own vehicle O has stopped due to the contact avoidance control without the fact that the cancellation request flag Fc related to the contact avoidance control has not been set to "1", as illustrated in FIG. 9, for example, the multi-information display 31c may display a message to encourage the driver to apply the brake.

Figure 10:
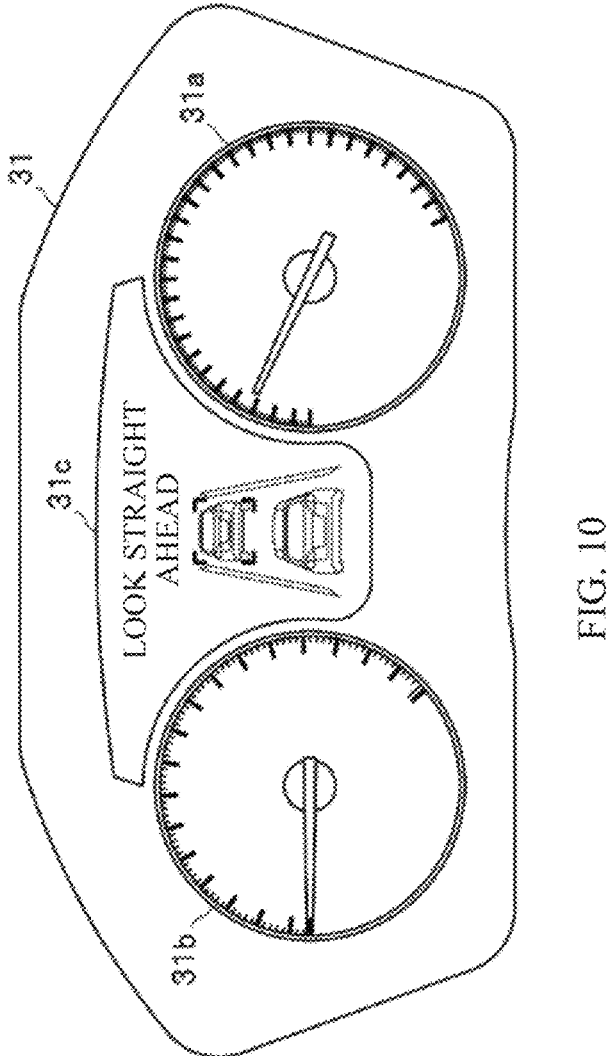
FIG. 10 is a diagram illustrating an example of presentation on the multi-information display of the combination meter in the driver assistance apparatus illustrated in FIG. 1.

When an engine stall occurs during the execution of the contact avoidance control, both the cancellation request flag Fc and the temporary standby flag Fs may be set to "1". Accordingly, even when the cancellation request flag Fc has been set to "1", the contact avoidance control may be continued until the own vehicle O stops. During the continuation of the contact avoidance control, as illustrated in FIG. 10, for example, the multi-information display 31c may display the message to alert the driver to the obstacle OB such as a preceding vehicle. In the case illustrated in FIG. 10, in which an engine stall has occurred, the engine RPM displayed on the tachometer 31b may be "0".

Figure 11:
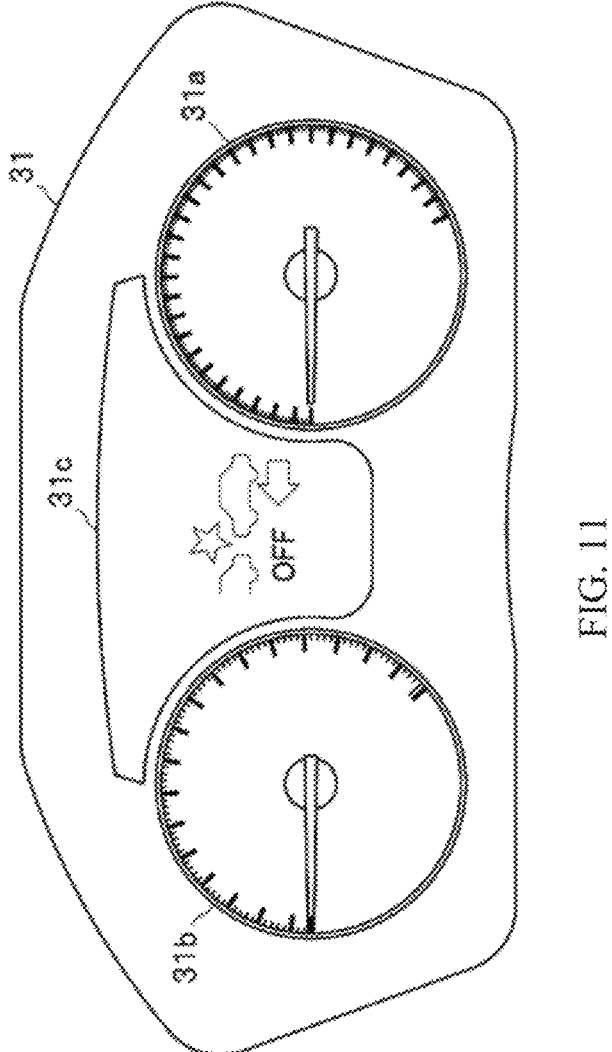
FIG. 11 is a diagram illustrating an example of presentation on the multi-information display of the combination meter in the driver assistance apparatus illustrated in FIG. 1.
Figure 12:
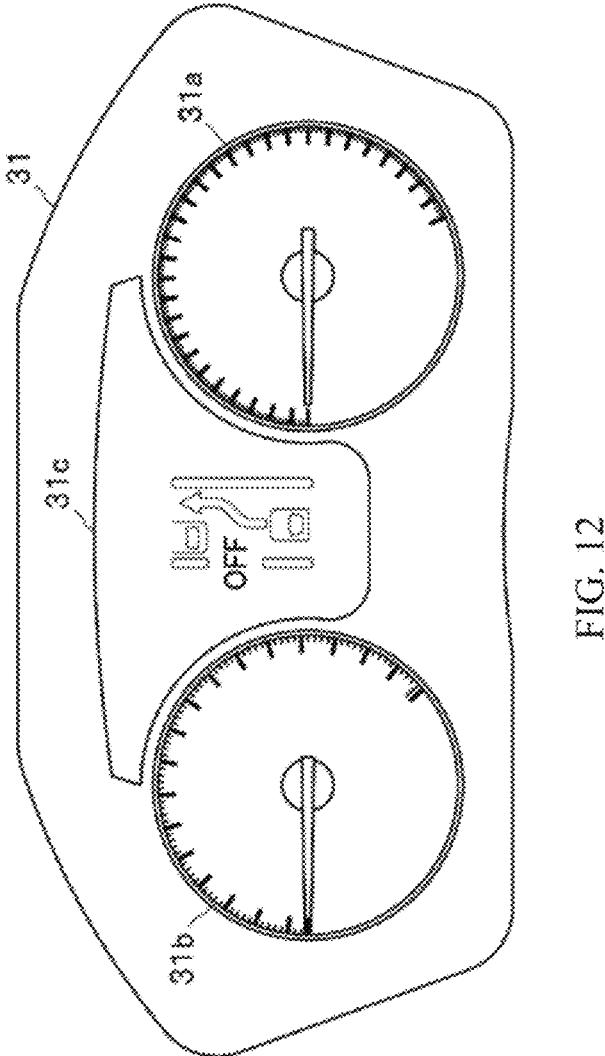
FIG. 12 is a diagram illustrating an example of presentation on the multi-information display of the combination meter in the driver assistance apparatus illustrated in FIG. 1.

When the temporary standby flag Fs is cleared to "0" and the contact avoidance control is canceled due to a stop of the own vehicle O, the multi-information display 31c may display a message informing that the driver assistance control (contact avoidance control) has been canceled. In some embodiments, as illustrated in FIG. 11, for example, when the own vehicle O has stopped without the execution of the emergency steering control, a message indicating that the AEB control has been turned off may be displayed to demonstrate that the driver assistance control has been canceled. Similarly, as illustrated in FIG. 12, for example, when the own vehicle O has stopped after the emergency steering control had been executed, a message indicating that the emergency steering control has been turned off may be displayed to demonstrate that the driver assistance control has been canceled.

According to this example embodiment, the traveling ECU 14 may make a request for cancellation of the driver assistance control when an engine stall occurs in the engine 5 during the execution of the driver assistance control including the contact avoidance control against obstacles. However, when an engine stall has occurred during the execution of the contact avoidance control, the traveling ECU 14 may temporarily put the request for cancellation of the driver assistance control on standby from the occurrence of the engine stall until the own vehicle O stops. This enables appropriate contact avoidance even when an engine stall has occurred in the own vehicle O equipped with a manual transmission 6 as a transmission.

When the own vehicle O is an MT vehicle equipped with a manual transmission 6 as a transmission, it may be assumed that engine stalls are likely to occur due to deceleration and other factors during the contact avoidance control. For this reason, even when an engine stall has occurred during the execution of the contact avoidance control, it may be unlikely that the engine stall has been caused by a malfunction of the engine 5. Since the contact avoidance control is mainly deceleration control performed on the own vehicle O, the contact avoidance control is basically allowed to continue even when the engine driving force ceases. Therefore, when an engine stall has occurred during the execution of the contact avoidance control, the traveling ECU 14 may temporarily put the request for cancellation of the driver assistance control on standby from the occurrence of the engine stall until the own vehicle O stops. This may enable appropriate contact avoidance even in the case of MT vehicles.

In this case, the traveling ECU 14 may cancel the request for cancellation of the driver assistance control when the engine 5 is restarted after an engine stall has occurred, based on the viewpoint that an engine stall during the execution of the contact avoidance control in MT vehicles is unlikely to be caused by a malfunction of the engine 5. This may make it possible to promptly return to the driver assistance control after the engine stall has been resolved.

The traveling ECU 14 may prevent the multi-information display 31c, for example, from displaying cancellation information about the driver assistance control while the request for cancellation of the driver assistance control is temporarily put on standby. This helps to prevent unnecessary information disclosure to the driver during emergency when the contact avoidance control is being executed.

Here, in the example embodiments described above, all or a part of the components such as the image recognition ECU 13, the traveling ECU 14, the CP_ECU 21, the E/G_ECU 22, the T/M_ECU 23, the BK_ECU 24, the PS_ECU 25, and the locator unit 26 may include a processor including hardware. Here, the processor may include, for example, units such as a central processing unit (CPU), a random access memory (RAM), a read only memory (ROM), a non-volatile memory, and a non-volatile storage, and have a known configuration that includes a non-transitory computer readable recording medium and its peripheral equipment. The units such as a ROM, a non-volatile memory, and a non-volatile storage may be preinstalled with software programs to be executed, for example, by the CPU, fixed data such as data tables, and other kinds of data. The CPU may read a software program stored, for example, in a ROM and expand it in a RAM and execute it, and the software program may refer, for example, to different kinds of data as appropriate, thereby implementing the functionalities of the configuration components, configuration units, and other elements described above.

The processor may include a semiconductor chip such as a field programmable gate array (FPGA). Besides, each of the configuration components, configuration units, and other elements described above may include electronic circuitry.

Furthermore, all or a part of the software program may be recorded as a computer program product on a portable disk, such as a flexible disk, a CD-ROM, or a DVD-ROM, or on a non-transitory computer readable medium, such as a card-type memory, a hard disk drive (HDD) device, or a solid state drive (SSD) device.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims. Furthermore, the example embodiments above may include inventions in various stages, and various inventions may be extracted by appropriate combinations of the components disclosed herein.

For example, even when some of the components are deleted from all the components described in the example embodiments above, the configuration without these components may be extracted as an invention as long as the issues mentioned above are solved and the advantageous effects mentioned above are achieved.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

One or both of the traveling ECU 14 and the E/G_ECU 22 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling ECU 14 and the E/G_ECU 22 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling ECU 14 and the E/G_ECU 22 illustrated in FIG. 1.

The invention claimed is:

1. A driver assistance apparatus for a vehicle equipped with a manual transmission, the driver assistance apparatus comprising:
   a recognizer configured to recognize information on a traveling environment outside the vehicle;
   a first processor configured to execute driver assistance control, based on the information on the traveling environment, the driver assistance control including contact avoidance control against an obstacle;
   a first determiner configured to determine whether an engine stall has occurred in an engine of the vehicle;
   a second determiner configured to, when the engine stall has occurred, output to the first processor a cancellation request to cancel the driver assistance control; and
   a standby unit configured to, when the engine stall has occurred during execution of the contact avoidance control, maintain the cancellation request without causing the first processor to cancel the driver assistance control from occurrence of the engine stall until the vehicle stops,
   wherein, while the cancellation request is maintained, the driver assistance control continues to be executed.

2. The driver assistance apparatus according to claim 1, wherein the second determiner is configured to cancel the cancellation request when the engine restarts after the occurrence of the engine stall.

3. The driver assistance apparatus according to claim 1, further comprising a second processor configured to, when the cancellation request of the driver assistance control is made, display information on the cancellation of the driver assistance control on a display, wherein
   the second processor is configured to refrain from displaying the information on the cancellation on the display while the cancellation request is on standby.

4. A driver assistance apparatus for a vehicle equipped with a manual transmission, the driver assistance apparatus comprising:
   a recognizer including a sensor and configured to recognize information on a traveling environment outside the vehicle using the sensor; and
   circuitry configured to:
      execute driver assistance control, based on the information on the traveling environment, the driver assistance control including contact avoidance control against an obstacle;
      determine whether an engine stall has occurred in an engine of the vehicle;
      when the engine stall has occurred, output a cancellation request to cancel the driver assistance control; and
      when the engine stall has occurred during execution of the contact avoidance control, maintain the cancellation request without canceling the driver assistance control from occurrence of the engine stall until the vehicle stops,
   wherein, while the cancellation request is maintained, the driver assistance control continues to be executed.

5. A driver assistance apparatus for a vehicle equipped with a manual transmission, the driver assistance apparatus comprising:
   a traveling ECU configured to execute driver assistance control including contact avoidance control against an obstacle, based on information on a traveling environment outside the vehicle; and
   an engine control ECU configured to output an engine RPM signal to the traveling ECU,
   wherein the traveling ECU is configured to:
      determine whether an engine stall has occurred in an engine of the vehicle, based on the engine RPM signal;
      when the engine stall has occurred, generate a cancellation request to cancel the driver assistance control;
      determine whether the contact avoidance control is being executed;
      when the contact avoidance control is being executed, maintain the cancellation request without canceling the driver assistance control from occurrence of the engine stall until the vehicle stops; and
      after the vehicle stops, cancel the driver assistance control based on the cancellation request.

* * * * *